United States Patent [19]

Brace et al.

[11] 4,087,117
[45] May 2, 1978

[54] MOTOR VEHICLE REAR SUSPENSION SYSTEM

[75] Inventors: John F. G. Brace, Billericay; Joseph L. Dreissiger, Benfleet; Anthony N. C. Earle, Shenfield, all of England

[73] Assignee: Ford Motor Company, Dearborn, Mich.

[21] Appl. No.: 714,059

[22] Filed: Aug. 13, 1976

[51] Int. Cl.² ............................................. B60G 11/36
[52] U.S. Cl. .................................... 280/724; 280/715
[58] Field of Search ............... 280/724, 715, 718, 720, 280/688; 267/18, 41, 163 R

[56] References Cited

U.S. PATENT DOCUMENTS

| | | | |
|---|---|---|---|
| 3,860,259 | 1/1975 | Allison et al. | 280/720 |
| 3,869,140 | 3/1975 | Allison | 280/715 |
| 3,904,219 | 9/1975 | Guerriero | 280/718 |
| 3,912,296 | 10/1975 | Allison et al. | 280/688 |

*Primary Examiner*—Richard A. Bertsch

*Attorney, Agent, or Firm*—Clifford L. Sadler; Keith L. Zerschling

[57] ABSTRACT

In a motor vehicle wheel suspension system according to this disclosure, the vehicle body is supported on a rigid rear axle by left and right coil springs. A pair of longitudinal suspension arms are pivotally connected to left and right axle brackets and to the vehicle body. The lower ends of left and right shock absorbers are connected to the axle brackets by pivots having transverse horizontal axes that are situated rearwardly of the axle. Each shock absorber has a link that is rigid with an intermediate part thereof and extends forwardly. Each link is connected to the adjacent one of the axle brackets by a pivot having a vertical axis. The construction of the connection between the shock absorbers and the axle permits the shock absorbers to function as reaction members with respect to braking torque loads on the axle. A transverse Panhard rod locates the body lateral with respect to the axle.

2 Claims, 2 Drawing Figures

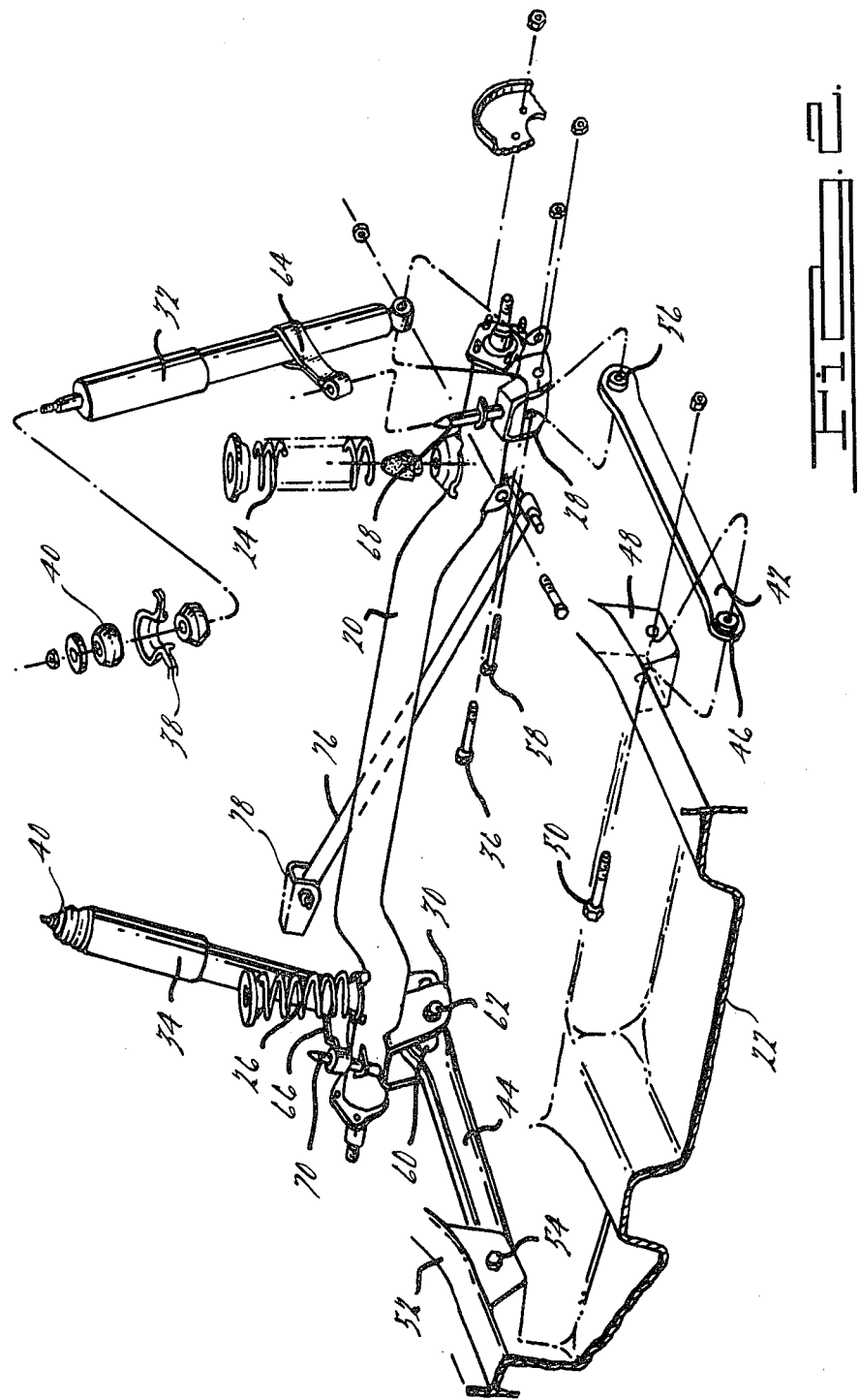

MOTOR VEHICLE REAR SUSPENSION SYSTEM

BACKGROUND AND SUMMARY OF THE DISCLOSURE

The present invention concerns rear suspension systems for motor vehicles and, more particularly, is concerned with a unique suspension construction having a unique mounting for the rear shock absorbers. A suspension according to the present invention is an improvement upon the suspension disclosed in U.S. Pat. No. 3,860,259 issued Jan. 14, 1975 and assigned to the assignee of this patent.

In a motor vehicle rear suspension system according to this disclosure, the sprung part of the vehicle is supported on a rigid rear axle by left and right coil springs. Left and right longitudinal suspension arms are pivotally connected to the vehicle body and to left and right brackets rigid with the rear axle. A Panhard rod extends between the body and the axle and laterally locates one with respect to the other.

The lower end of left and right shock absorbers are pivotally connected to the axle brackets about transverse horizontal axes disposed to the rear of the axle. A link rigid with an intermediate part of each shock absorber extends forwardly therefrom and is pivotally connected to the adjacent bracket about an axis that extends in a vertical direction, the vertical axis being disposed forwardly of the axle.

A vehicle suspension according to the present invention is characterized by its superior performance and simplicity of construction. It is particularly well suited to light weight front wheel drive passenger cars. One feature of the suspension is the unique construction connecting the shock absorbers to the axle which allows the shock absorbers to carry braking torque loads. These loads on the axle are transmitted to the shock absorbers without inhibiting roll movement of the vehicle body relative to the axle.

BRIEF DESCRIPTION OF THE DRAWINGS

The many objects and advantages of the present invention will become apparent upon consideration of the following detailed discussion and the accompanying drawings, in which:

FIG. 2 is a perspective view, partly exploded, of the rear suspension of FIG. 1.

DETAILED DESCRIPTION OF THE PREFERRED EMBODIMENT

Figure 1:
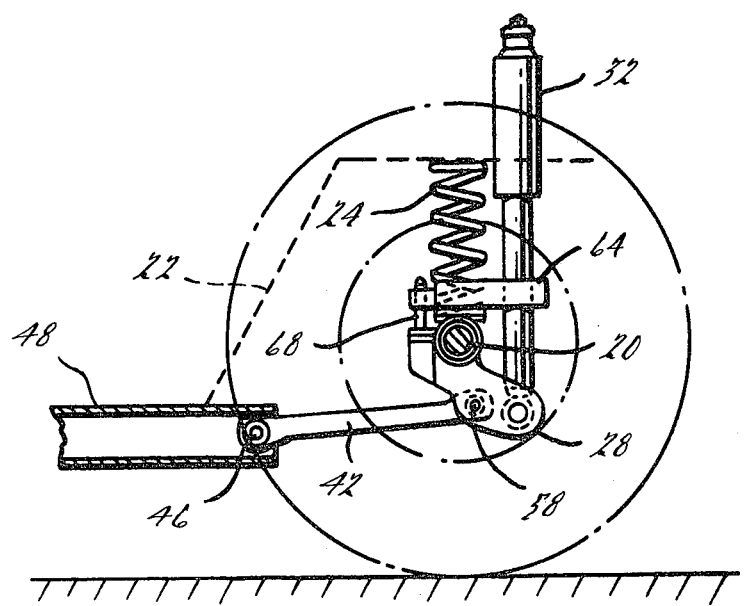
FIG. 1 is a diagrammatic side elevational view of a rear suspension for a motor vehicle according to the invention.

FIGS. 1 and 2 illustrate the presently preferred embodiment of the invention. A rigid rear axle 20 rotatably supports left and right road wheels at its outer ends. The vehicle body 22 is resiliently supported on the axle 20 by means of left and right coil springs 24 and 26 which have their upper ends engaging spring seats formed in the vehicle body and the lower ends engaging spring seats welded to the axle 20. Left and right axle brackets 28 and 30, each having a generally U-shape downwardly open configuration, are welded to the underside of the axle 20 adjacent either end thereof. Left and right shock absorbers 32 and 34 each have an eye at its lower end that contains a resilient bushing. Bolts 36, which pass through the resilient bushings, secure the lower ends of the shock absorbers 32 and 34 to the rearwards ends of the left and right axle brackets 28 and 30. Each of the shock absorbers 32 and 34 extends generally upwardly behind the axle 20 and has its upper end connected to the vehicle body portion 38 by means of a mounting construction that includes resilient elements 40.

The transverse axle 20 is located logitudinally in the vehicle body by longitudinally extending suspension arms 42 and 44. The forward end of the left arm 42 supports a resilient bushing 46, which is secured to the U-shaped bracket member 48 formed integrally of the vehicle body 22, by means of a bolt 50. Similarly, the right suspension arm 44 is connected to a channel portion 52 of the vehicle body 22 by means of a pivot bolt 54.

The rearward end of the suspension arm 42 has an eye that contains a resilient bushing 56 which is secured to the bracket 28 by means of a pivot bolt 58. A resilient bushing 60 at the rearward end of the right suspension arm 44 is joined to the axle bracket 30 by a pivot bolt 62.

The axle 20 is restrained from rotational movement under torsional loads (such as occur during braking) by the manner in which the shock absorbers 32 and 34 are connected to the axle. The lower ends of the shock absorbers 32 and 34 are secured to the brackets 28 and 30 by the bolts 36 as already described. In addition, links 64 and 66 have their rearward ends rigidly secured, as by welding, to intermediate location on the left and right shock absorbers 32 and 34. Each of the links 64 and 66 extends forwardly across the axle 20. The forward ends of links 64 and 66 have eyes that contain bushings which engage upstanding pins 68 and 70 welded to the left and right axle brackets 28 and 30.

A Panhard rod 72 has its upper end pivotally connected to a bracket 78 that is welded to the vehicle body 22. The lower end of the Panhard rod 76 is pivotally connected to a bracket welded to the axle 20. Panhard rod 76 is provided for lateral guidance of the axle 20.

OPERATION

During jounce and rebound movement of the axle 20 the suspension arms 42 and 44 locate the axle longitudinally with respect to the vehicle body 22. The vehicle body is resiliently supported on the axle 20 by the left and right coil springs 24 and 26. Jounce and rebound movement of the axle 20 is damped by the hydraulic shock absorbers 32 and 34. During braking, torsional loads on the axle 20 are transmitted to the vehicle body 22 by means of the unique connection between the shock absorbers 32 and 34 and the axle 20.

The shock absorbers prevent the axle 20 from rotating about a transverse horizontal axis. The unique connections between the shock absorbers 32 and 34 and the axle permit the shock absorbers to serve as reaction members for braking torque loads. The pivotal connections between the lower ends of the shock absorbers 32 and 34 with the brackets 28 and 30 and the connections between the links 64 and 66 with the pins 68 and 70 permits roll of the vehicle body about a longitudinal axis without imposing an objectionable bending load on the shock absorbers.

The foregoing description presents the presently preferred embodiment of this invention. Modifications and alterations may occur to those skilled in the art that come within the scope of the following claims.

We claim:

1. A rear suspension system for a motor vehicle having a vehicle body;

an axle rotatably supporting left and right road wheels;

suspension means interconnecting said vehicle body and said axle;

said suspension means including left and right longitudinally extending suspension arms;

pivot means povitally connecting said arms to said vehicle body and to said axle;

left and right coil springs constructed to resiliently support a portion of the mass of said vehicle body on said axle;

left and right generally vertically arranged telescopic shock absorber struts;

left and right first resilient pivot means connecting said left and right shock absorber struts, respectively, to said axle;

left and right second resilient pivot means spaced apart from said first resilient pivot means connecting said left and right shock absorber struts, respectively, to said axle;

means constructed to limit lateral displacement of said body relative to said axle;

a Panhard rod arranged generally transversely of said vehicle body and having one end pivotally connected to said vehicle body and its other end pivotally connected to said axle.

2. A rear suspension system for a motor vehicle having a vehicle body;

an axle rotatably supporting left and right road wheels;

suspension means interconnecting said vehicle body and said axle;

said suspension means including left and right longitudinally extending suspension arms;

pivot means pivotally connecting said arms to said vehicle body and to said axle;

left and right coil springs constructed to resiliently support a portion of the mass of said vehicle body on said axle;

left and right generally vertically arranged telescopic shock absorber struts;

said shock absorber struts having their lower ends pivotally connected to said axle by first resilient pivot means;

said first resilient pivot means having a transverse pivot axis located rearwardly and downwardly from the axis of rotation of said road wheels;

a link rigidly connected to each of said shock absorber struts and extending forwardly therefrom;

said link being disposed above said axle;

a second resilient pivot means connecting the forward end of said link of each of said struts to said axle;

said second resilient pivot means having a vertical pivot axis;

a Panhard rod extending generally transversely of said vehicle body and pivotally connected to said body and to said axle.

* * * * *